ABSTRACT OF THE DISCLOSURE

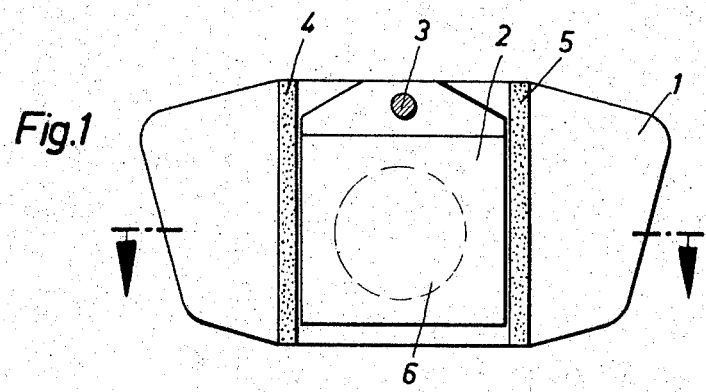
Fig.1
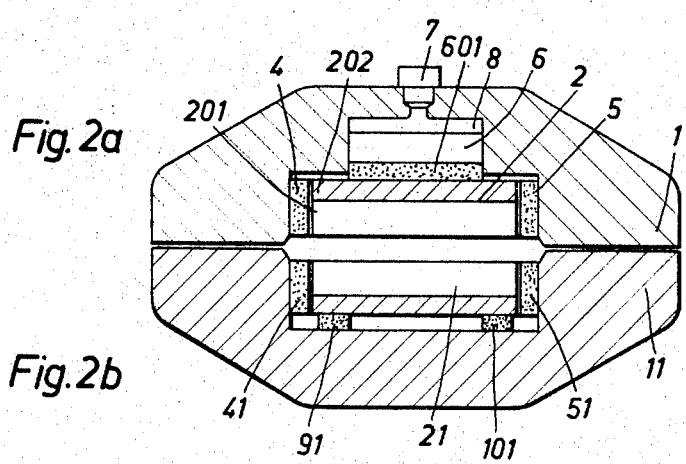
Fig.2a
Fig.2b
ULRICH VÖLKER
GÜNTER GERLOFF
HEINZ HASELOFF
Inventors 3,435,927
FRICTION DISC BRAKE COMPRISING FRICTION PADS WITH LININGS OF SINTERED FRICTION MATERIAL
Ulrich Volker and Gunter Gerloff, Reinbek, and Heinz Haseloff, Glinde, Germany, assignors to Jurid Werke GmbH, Glinde, Reinbek, Germany
Filed Aug. 23, 1967, Ser. No. 662,706
Claims priority, application Germany, Aug. 23, 1966, J 31,604
Int. Cl. F16d 65/78
U.S. Cl. 188—264                                    2 Claims

A caliper member of a hydraulically actuated disc brake system has a depression therein with a brake shoe seated in the depression. Heat-insulating liner members are disposed between the side surfaces of the brake shoe and the side walls of the depression, each of the liner members having at least one integral extension and being fixedly mounted on a side wall of the caliper by engagement of that extension with correspondingly formed parts of the caliper. Portions of the confronting faces of the liner members and the side walls of the caliper are spaced from each other by air gaps. Preferably, the liner members consist essentially of 20 to 40 percent by weight rock wool, 40 to 60 percent by weight asbestos, and 15 to 20 percent by weight phenolic resin.

---

Figure 5:
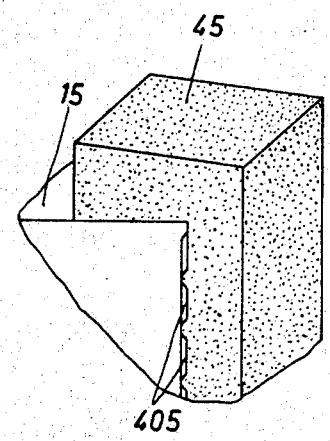

The invention relates to improvements in hydraulically actuated friction disc brakes and especially to brakes of that kind in which the braking force is exerted by means of friction pads consisting of sintered friction material. It is known in the art to support friction pads on friction members in a caliper which is provided with parts of hydraulic actuating means for braking.

In consequence of increases in the braking efficiency of brakes, the kinetic energy which has to be consumed results in higher and higher temperatures. These high temperatures frequently amounting to more than 400° centigrade are not compatible with conventional friction materials comprising organically bound components. Therefore, friction materials have to be used which completely consist of inorganic material. Such friction materials are mainly produced from powdered metals or powdered metal oxides by pressing and sintering. Because of their high heat resistance, these materials are better suited to the purpose than materials comprising organic binding material, i.e. resins or elastomeric products. By using these materials, very advantageous and compact structures are possible.

In many applications, a disadvantage is to be seen in the high thermal conductivity of the substantially metallic and sintered friction material. Precautions have to be taken against heat developed during braking, passing into the hydraulic actuating means of the brake.

These difficulties may occasionally be encountered also in braking systems having organically bound friction members. Therefore, several systems are known in which between the brake lining lying against the brake disc, and the hydraulic actuating means, heat insulating means are interposed. Conventionally such heat insulating means are integrally connected with either the friction lining support, or the actuating piston of the hydraulic system. A disadvantage of the conventional systems is to be seen in the facts that especially when using sintered friction materials, the effectiveness of the insulation is not sufficient, and that the insulating means and the fixing means for the latter, are not strong enough for the mechanical and/or thermal stress. Besides, when sandwiched structures of insulating and supporting parts are thermally stressed, different thermal expansions frequently show an unfavourable influence because at high temperatures the connection will become unreliable; the supporting parts might distort and the insulating material might chip off.

It is a main object of the invention to avoid these difficulties met in conventional systems. Further objects of the invention are: to increase the heat capacity of a hydraulically actuated disc braking system in which the braking force is applied by friction pads, the increased heat capacity being achieved without detrimentally affecting the caliper and the hydraulic actuating means; to provide a braking system of the described general type in which heat produced by the braking action can be subtracted from the friction lining, and in which the thermal stresses acting on the friction pad, are minimized; to provide a braking system of the described general type in which during operation, a minimum of distortional load is acting on the friction pads.

These and other objects are achieved by a hydraulically actuated friction disc brake which is characterized in that those areas of the caliper against which abut the edges of the friction linings supported by friction pads in operation, are lined with heat insulating liner members which are secured to the caliper. The insulating liner members may be connected to the brake caliper by means of screw bolts or adhesive, in case of low thermal stresses.

A preferred embodiment adapted to higher thermal stresses, is characterized in that the heat insulating liner members are connected to the caliper by clamping such members onto the caliper by means of e.g. a dovetail joint. In a preferred embodiment, the liner members are provided with a U-shaped cross section proportioned so that the legs of the U straddle the caliper like a clamp. Such clamping connections are preferably constructed so that between the liner member and those areas of the caliper located nearest to the friction member, air gaps are provided which favourably contribute to the insulating effect.

The material of the liner members should not only have a high heat insulating effect, but also an adequate strength for receiving the compressive load. A material especially well suited for this purpose comprises according to the invention:

|  | Percent by weight |
|---|---|
| Rock wool | 20 to 40 |
| Asbestos | 40 to 60 |
| Phenolic resin | 15 to 20 |

Material of this kind showed a thermal conductivity of $$0.94 \frac{\text{kcal.}}{\text{mh. centigrade}}$$

combined with a compressive strength of 4.000 kp./cm.²

Further objects and advantages of the invention will become apparent from the following detailed description taken in conjunction with the accompanying drawings which form a part of the specification.

Figure 6:
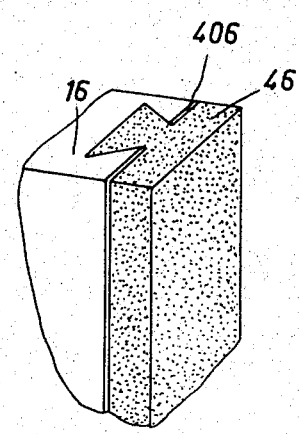
Figure 3:
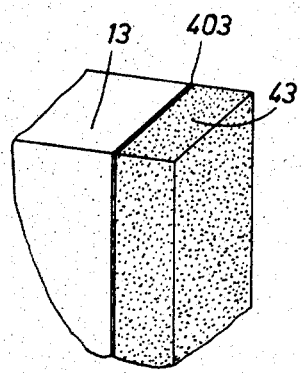
Figure 4:
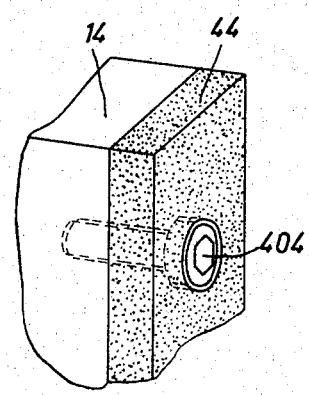

In the drawings:
FIG. 1 shows one half of a brake caliper of a disc brake having friction pads;
FIG. 2a is a sectional view taken in the direction of the arrows of FIG. 1;
FIG. 2b is a sectional view of one half of a brake caliper belonging to a floating caliper brake;
FIG. 3 shows a part of a brake caliper with a liner member secured thereto by adhesive;
FIG. 4 is a view similar to FIG. 3 but showing a liner member secured to a brake caliper by bolting;
FIG. 5 is a view similar to FIG. 3, of a liner member having a U-shaped profile; and FIG. 6 is a view similar to FIG. 3 and showing a dovetail connection between a liner member and a brake caliper.

FIG. 1 shows one half of a brake caliper 1. Screw threaded holes provided in this caliper, are shown by crosses on both sides of FIG. 1. In the caliper, friction pads 2 are supported by means of bolts 3. During a braking operation, the friction pads are moved by the frictional contact with the brake disc (not shown), and according to the rotational direction of the latter, are then lying against a liner member 4, or 5, mounted in the caliper 1.

A friction pad 2 as shown in FIG. 2a comprises a sintered friction lining 201, fixedly secured on a support 202. With further reference to this figure, a hydraulic piston 6 is mounted in a cylinder 8 which is provided with a connection fitting 7 for connecting cylinder 8 with a source of pressurized hydraulic fluid, not shown.

On actuation of the brake, the piston 6 is operable to press the friction pad 2 against the brake disc. The hydraulic piston 6 might be insulated too, in a manner known per se, against heat created during the braking operation. For thus purpose, a pad 601 preferably being of the same material as liner members 4 and 5, is mounted on piston 6 between piston 6 and pad 2. Favourable temperature conditions will exist with liner members 4 and 5 of at least 2 mm. thickness, preferably of 3 to 8 mm. thickness.

In case the friction pad disc brake is a brake with a stationary caliper, the other half of the caliper not shown here is constructed symmetrically.

In FIG. 2b one half of a caliper belonging to a floating caliper brake is shown. A friction pad 21 is supported in that half, and will be operated by reaction force when in the other half of the caliper, not shown here but constructed similarly as that part shown in FIG. 2a, a friction pad is operated by hydraulic pressure. The caliper 11 of FIG. 2b contains insulating liner members 41 and 51, and besides, heat insulating liner members 91 and 101 are provided, according to the invention, between friction pad 21 and caliper 11, at the back of the former. In FIGS. 3 through 6 embodiments of the invention are shown making use of different ways for mounting the liner members on a caliper.

According to FIG. 3, a liner member 43 is connected to a caliper 13 by means of a layer of adhesive 403. According to FIG. 4, a liner member 44 is fixedly secured to a caliper 14 by means of screw bolts 404.

FIGS. 5 and 6 are representations of clamping connections between liner members 45 and 46, and calipers 15 and 16, respectively. According to FIG. 6, the liner member 46 is clamped onto the caliper 16 by means of a splined connection having a dovetail cross section. According to FIG. 5, liner member 45 is provided with a U-shaped cross section straddling a correspondingly formed part of the caliper 15. These embodiments have proved to be of especial advantage. When using clamping connections, the engagement of the surfaces of the liner members and the caliper can be controlled so that small air gaps 405 and 406, respectively, are provided. Because of different thermal expansion, such gaps will grow upon actuation of the brake, thus having a favourable influence on the effectiveness of the heat insulation. It may be of special advantage to favour the forming of air gaps by providing appropriate constructive means. For instance, small projections may be provided on the caliper or on the liner members, as shown in FIG. 5. This can be done without diminishing the compressive strength of the whole system.

We claim:

1. In combination with a caliper member of a hydraulically actuated disc brake system, said caliper member having a depression having bottom and side walls and opening through a surface of said caliper member, a friction pad having front, back and side surfaces, a friction lining supported on the front surface of said pad, said friction lining consisting of sintered friction material, said pad being disposed in said depression with its back surface facing the bottom of the depression and being movable toward and away from the bottom of the depression, and heat-insulating liner members between the side surfaces of said pad and the side walls of said depression, each of the liner members having at least one integral extension and being fixedly mounted on a side wall of the caliper by engagement of said extension with correspondingly formed parts of the caliper, portions of the confronting faces of said liner members and said side walls of the caliper being spaced from each other by air gaps, said pad being movable by frictional forces into engagement with said liner members.

2. Structure as claimed in claim 1, the liner members consisting essentially of 20 to 40 percent by weight rock wool, 40 to 60 percent by weight asbestos, and 15 to 20 percent by weight phenolic resin.

References Cited

UNITED STATES PATENTS

| | | | |
|---|---|---|---|
| 2,633,433 | 3/1953 | Hollenberg | 252—62 X |
| 2,793,427 | 5/1957 | Marvin. | |
| 2,801,714 | 8/1957 | Dotto. | |
| 3,033,326 | 5/1962 | Byers. | |
| 3,162,271 | 12/1964 | Hanson | 188—73 |
| 3,179,209 | 4/1965 | Lucien et al. | 188—73 X |

GEORGE E. A. HALVOSA, *Primary Examiner.*